United States Patent Office 2,795,941
Patented June 18, 1957

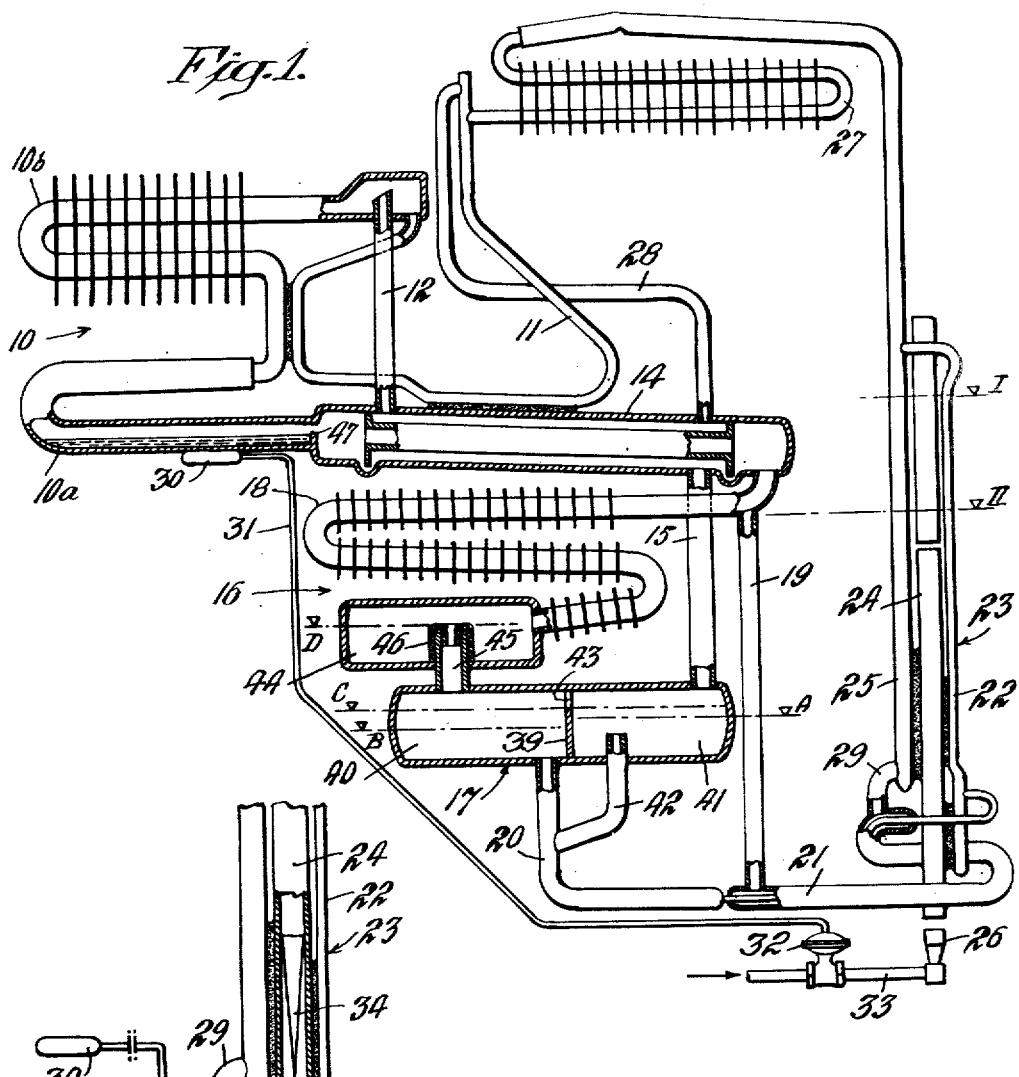

2,795,941
ABSORPTION REFRIGERATION

Axel Gosta Hellstrom, Johanneshov, Sweden, assignor to Aktiebolaget Elektrolux, Stockholm, Sweden, a corporation of Sweden Continuation of application Serial No. 355,329, May 15, 1953. This application May 29, 1956, Serial No. 588,126

Claims priority, application Sweden May 16, 1952

18 Claims. (Cl. 62—119.5)

My invention relates to absorption refrigeration, and more particularly to such a refrigeration system employing an auxiliary pressure equalizing gas. This application is a continuation of my application Serial No. 355,329, filed May 15, 1953, now abandoned.

It has been proposed in refrigeration systems of this kind to adjust the concentration of refrigerant in the absorption liquid circuit by accumulating liquid refrigerant with variations in operating conditions, and subsequently redistributing absorption liquid in the absorption liquid circuit to cause such accumulated refrigerant to be introduced in a positive and controlled manner into the absorption liquid circuit. Such redistribution of absorption liquid in its circuit may be effected by making use of absorption liquid available in certain parts of the absorption liquid circuit when normal circulation of absorption liquid is terminated or substantially reduced.

In order to introduce the accumulated liquid refrigerant in an effective manner into the absorption liquid circuit, it is extremely important for an adequate quantity of absorption liquid to be redistributed or transferred in such circuit. In many instances the quantity of absorption liquid available for redistribution or transfer in the absorption liquid circuit is below a definite critical value and inadequate to effect complete mixing of accumulated liquid refrigerant with absorption liquid when it is desired to return the refrigerant to the absorption liquid circuit. This is objectionable because the full advantages for effecting return of accumulated refrigerant to the absorption liquid circuit by redistribution of absorption liquid are not realized.

The object of my invention is to provide an improvement for adjusting more precisely the concentration of refrigerant in the absorption liquid circuit. I accomplish this by storing a quantity of absorption liquid in the absorption liquid circuit in such a manner that such stored liquid is withheld or withdrawn from circulation during normal operation of the system and promptly made available, when redistribution of the absorption liquid occurs, to insure nice control of the introduction of accumulated liquid refrigerant into the absorption liquid circuit.

The above and other objects and advantages of the invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing in which:

Fig. 1 illustrates more or less diagrammatically an absorption refrigeration system of the inert gas type embodying the invention; and Fig. 2 is a fragmentary view of a refrigeration system like that shown in Fig. 1 diagrammatically illustrating another manner of heating the system.

Referring to Fig. 1, I have shown my invention in connection with an air-cooled absorption refrigeration system of a uniform pressure type in which an auxiliary pressure equalizing gas is employed. Systems of this type are well known and include a cooling unit or evaporator structure 10 which is arranged to abstract heat from the thermally insulated interior of a refrigerator cabinet. Refrigerant fluid, such as ammonia, flows through a conduit 11 into the cooling unit 10 and evaporates and diffuses therein into an inert gas, such as hydrogen, to produce a refrigerating effect. The resulting gas mixture of refrigerant and inert gas flows from cooling unit 10 through a conduit 12, gas heat exchanger 14 and vertically extending conduit 15 into an air-cooled absorber unit 16 comprising a shell or container 17 and a looped coil 18.

In the absorber unit 16 refrigerant vapor is absorbed by a suitable absorbent, such as water, for example, which is introduced into coil 18 through a conduit 19. The hydrogen or inert gas, which is practically insoluble and weak in refrigerant, is returned through gas heat exchanger 14 to the lower end of cooling unit 10. During operation of the refrigeration system, heat is liberated in the absorber unit 16 due to absorption of refrigerant vapor into absorption liquid. Such heat of absorption is given up to surrounding cool air which passes over the surfaces of the absorber unit and the temperature of which is determined by the temperature of the cool air flowing in heat exchange relation therewith.

The circulation of gas in the gas circuit just described is due to the difference in specific weight of the columns of gas rich and weak, respectively, in refrigerant vapor. Since the column of gas rich in refrigerant vapor and flowing from the upper end of cooling unit 10 to the absorber coil 18 is heavier than the gas weak in refrigerant vapor and flowing from such coil to the lower end of the cooling unit, a force is produced or developed within the system for causing circulation of inert gas in the manner described.

From the container 17 enriched absorption liquid, which is also referred to as absorption solution, is conducted through a conduit 20 and liquid heat exchanger 21 into a vapor lift pump 22 of a generator or vapor expulsion unit 23. The generator 23 comprises a heating tube 24 having the vapor lift pump 22 and a boiler 25 in thermal exchange relation therewith. By heating generator 23, as by fluid fuel burner 26, for example, liquid from the heat exchanger 21 is raised by vapor lift action through pump 22 into the upper part of boiler pipe 25. The liberated refrigerant vapor entering boiler pipe 25 through the pump 22, and also vapor expelled from solution in the boiler pipe, flows upwardly into an air-cooled condenser 27 in the form of a coil having fins fixed thereto.

Refrigerant vapor is liquefied in the condenser 27 by surrounding cooling air which flows over the surfaces of the coil and fins, and the liquefied refrigerant is returned to the cooling unit 10 through the conduit 11 to complete the refrigerating cycle. Liquid refrigerant flows by gravity in the cooling unit 10 in the presence of upwardly flowing inert gas, the inert gas flowing upwardly in counterflow to the refrigerant in a low temperature section 10a and then in a higher temperature section 10b. The lower end of condenser 27 is connected by a conduit 28 to the gas circuit, as to the gas heat exchanger 14, for example, so that any non-condensable gas that may pass into the condenser will flow to the gas circuit and not be trapped in the condenser. The weakened absorption solution, from which refrigerant has been expelled, is conducted from boiler pipe 25 through a conduit 29, liquid heat exchanger 21 and conduit 19 into the upper part of absorber coil 18. Circulation of absorption solution in the manner just described is due to raising of liquid from a low level to a higher level I in boiler pipe 25. Absorption liquid flows downwardly from level I in generator 23 and overflows from the upper end of conduit 19 into the upper end of the absorber coil 18 at the level II. The quantity of liquid held in boiler pipe 25 between the levels I and II defines the static pressure head required to overcome the resistance offered to flow of liquid from the boiler pipe to the upper end of the absorber coil 18.

The refrigeration system just described may be controlled by a thermal bulb 30 which is affected by a temperature condition of cooling unit 10. As shown, the thermal bulb 30 is arranged in thermal exchange relation with the bottom part of low temperature section 10a of cooling unit 10 and connected by a conduit 31 to a control device 32 which is connected in a fuel supply conduit 33 of burner 26. The thermal bulb 30 and conduit 31 may form part of an expansible fluid thermostat which is charged with a suitable volatile fluid and responds to changes in temperature of cooling unit 10 to operate control device 32, in a manner well known in the art.

When the temperature of cooling unit 10 increases due, for instance, to increase in heat load caused by placing of warm material in the thermally insulated interior of the refrigerator, or rise in room air temperature, the thermal bulb 30 in normal operation of the refrigeration system becomes effective to operate control device 32 to increase the supply of fuel to burner 26. This increases the heat input and hence the rate at which refrigerant vapor is expelled from solution in generator 23, thereby increasing the amount of refrigerant vapor which condenses in condenser 27 and flows into cooling unit 10. Conversely, when the temperature of cooling unit 10 decreases, the thermal bulb 30 becomes effective to operate control device 32 to decrease the supply of fuel to burner 26. This reduces the heat input and hence the rate at which refrigerant vapor is expelled from solution in generator 23, thereby decreasing the amount of refrigerant vapor which condenses in condenser 27 and flows into cooling unit 10.

The thermostatic control just described is of the kind in which the supply of fuel desirably is reduced to such an extent that substantially no vapor is expelled from solution in generator 23 when the cooling unit 10 reaches a predetermined low temperature. In other words, under these conditions only a sufficient quantity of fuel is supplied to the burner 26 to maintain the latter ignited and only heat of liquid is supplied to the solution in generator 23 at such times. When the fuel supply to burner 26 is inadequate for the burner to supply heat of vaporization to the solution in the generator, no expulsion of refrigerant vapor from solution will take place and the solution will be maintained below its boiling temperature. Since no expulsion of vapor from solution will take place in generator 23 when the supply of fuel to burner 26 is reduced sufficiently by the thermostatic control in the manner just explained, no lifting of liquid by vapor lift action will take place in the vapor lift pump 22 under these conditions and the circulation of absorption solution through and between the generator 23 and absorber unit 16 will stop. Hence, when the thermostatic control provided acts to reduce the supply of fuel to burner 26 and refrigerant vapor is no longer expelled from solution in the generator 23 and pump 22 is no longer effective to raise liquid to cause circulation of absorption solution, the supply of heat to the generator 23 for the purpose of producing useful refrigeration is interrupted and essentially cut off for all practical purposes.

In Fig. 2 is illustrated another manner of supplying heat to the generator 23 by an electrical heating element 34 disposed within the lower part of heating tube 24. In this instance the control device 32 forming part of the expansible fluid thermostat is operatively associated with a switch 35 connected in one of the conductors 36 for supplying electrical energy to heating element 34. The control arrangement of Fig. 2 is of the "on" and "off" type in which the thermal bulb 30 becomes effective to cause control device 32 to close switch 35 and energize heating element 34 when the temperature of cooling unit 10 increases due to increase in load. Conversely, when the cooling unit 10 reaches a predetermined low temperature the thermal bulb 30 becomes effective to cause control device 32 to open switch 35 and disconnect heating element 34 from the source of supply of electrical energy. In Fig. 2 switches 37 and 38 are associated with the thermostatically controlled switch 35 for controlling the supply of electrical energy to the heating element 34.

The refrigeration system of Fig. 1 embodies provisions for adjusting the concentration of refrigerant in the absorption liquid circuit by accumulating and storing liquid refrigerant with variations in operating conditions, and subsequently introducing such stored liquid refrigerant into the absorption liquid circuit in a controlled manner. In Fig. 1 this is accomplished by providing in the container 17 a baffle or partition 39 to form adjacent spaces or vessels 40 and 41. The vessel 40 functions as the absorber vessel having a liquid inlet at the upper end thereof which receives absorption liquid from the lower end of the absorber coil 18 and in which space is maintained a body of absorption liquid enriched in refrigerant. The absorber vessel 40, through which flow of liquid is effected from coil 18 to conduit 20 connected thereto, forms an active portion of the absorption liquid circuit in which the liquid normally circulates during operation of the refrigeration system.

The vessel 41 functions as an accumulation or concentration vessel in which is stored unevaporated refrigerant passing from the cooling unit or evaporator 10. Such excess or unevaporated refrigerant passes from the lower end of cooling unit 10 and flows along the bottom part of the gas heat exchanger 14 and conduit 15 into the vessel 41, the unevaporated refrigerant entering the vessel 41 through conduit 15 with inert gas enriched in refrigerant. A conduit 42 connects the bottom part of vessel 41 and an upper part of the conduit 20 at the vicinity of vessel 40. In this way a region below the liquid surface level of the liquid body in vessel 41 is in free liquid communication with a region below the liquid surface level of the liquid body in vessel 40, the connecting passage provided by the conduit 42 being completely filled with liquid under all operating conditions of the system. Free liquid communication is established in such a manner between the liquid bodies in vessels 40 and 41 that vessel 41 constitutes a part which is disposed outside the active portion of the absorption liquid circuit and in which normal flow of absorption liquid is absent.

In view of the foregoing, it will now be understood that a body of absorption liquid is held in the absorber vessel 40 and that absorption liquid passes through conduit 42 into the vessel 41. Under certain operating conditions unevaporated refrigerant also passes from the cooling unit 10 into the vessel 41 and accumulates therein. The inert gas enriched in refrigerant and flowing from the cooling unit 10 through the conduit 15 passes through the vapor space of vessel 41 and then enters the vapor space of absorber vessel 40 through an opening 43 in the upper part of partition 39. From vessel 40 inert gas enriched in refrigerant flows upwardly through coil 18 in counterflow to the absorption liquid flowing downwardly therein.

As long as the liquid surface level in accumulation vessel 41 remains below the opening 43 in partition 39, the unevaporated liquid refrigerant accumulated therein essentially will be withdrawn from the absorption liquid circuit. Such refrigerant will be absorbed into absorption liquid held in vessel 41 and increase the concentration of refrigerant in such absorption liquid to a value materially greater than the concentration of refrigerant in the absorption liquid in vessel 40 which flows therefrom through conduit 20. By reason of the free liquid communication provided by conduit 42 between the liquid body in vessel 41 and the active portion of the absorption liquid circuit, some transfer of accumulated refrigerant by diffusion from vessel 41 into the active portion of the absorption liquid circuit cannot be avoided. Such transfer of accumulated refrigerant, which involves equalization of the concentration of refrigerant in the liquid body in vessel 41 and liquid in the active portion of the absorption liquid circuit, takes place relatively slowly and without the exercise of any positive control.

However, in Fig. 1 stored liquid refrigerant in vessel 41 is positively introduced into the active portion of the absorption liquid circuit in a controlled manner by redistributing the absorption liquid in its circuit and increasing the quantity of such liquid held in the vessel 40. The quantity of liquid held in vessel 40 is increased when the heat supply to the generator 23 is reduced sufficiently to render the vapor lift pump 22 inactive, thereby terminating the raising of absorption liquid to the level I in Fig. 1. Under these conditions normal circulation of liquid stops and the quantity of liquid held in boiler pipe 25 between the levels I and II spills over into the upper end of the absorber coil 18 from conduit 19. When the pump 23 becomes inactive, some liquid is, therefore, transferred from boiler 25 to absorber coil 18 and eventually collects in the vessel 40. Also, liquid contained in the absorber coil 18 and wetting the inner wall surfaces thereof will flow downwardy therefrom into the absorber vessel 40 to increase the quantity of absorption liquid held in vessel 40 and raise the liquid surface level therein.

When ammonia and water are employed as the refrigerant and absorption liquid, respectively, and unevaporated ammonia passes from the cooling unit 10 and accumulates in vessel 41 and forms a part of the liquid body therein, the liquid surface level in vessel 41 will be higher than that in vessel 40 depending upon the increase in concentration of ammonia in the absorption liquid in vessel 41. This is so because, as unevaporated ammonia collects in vessel 41, the specific gravity of the absorption liquid in that vessel decreases and a liquid body of greater height is required in vessel 41 to balance the body of absorption liquid of less height in vessel 40. Such higher liquid level in the vessel 41 may be represented by the dotted line A in Fig. 1 while the lower liquid level in the vessel 40 may be represented by the dotted line B. When unevaporated ammonia has accumulated in vessel 41 and absorption liquid held in other parts of the system is transferred to the absorber vessel 40, the quantity of liquid in the latter increases and the liquid surface level therein rises.

When the liquid surface level in vessel 40 increases, a similar increase in liquid surface level also takes place in vessel 41. Since the liquid surface in vessel 41 is at a higher level than in vessel 40 when liquid refrigerant has accumulated in the former, as just explained, and the liquid surface levels in both vessels increase when an adequate quantity of absorption liquid is transferred to vessel 40, it will be evident that liquid in vessel 41 will be the first to reach the level C of the opening 43 and overflow therethrough into vessel 40. In this way liquid refrigerant accumulated and stored in vessel 41 can be positively transferred therefrom into vessel 40 which, as previously explained, forms a part of the active portion of the absorption liquid circuit. Further, liquid refrigerant is transferred from vessel 41 to vessel 40 responsive to increase in the surface level of liquid in the vessel 40, such transfer of liquid being effected at a rate faster than that at which liquid refrigerant can be transferred by diffusion from vessel 41 through conduit 42 to the active portion of the absorption liquid circuit.

Let us assume that an air-cooled refrigeration system generally like that shown in Fig. 1 and described above is charged with ammonia, hydrogen and water so that the system will operate in a satisfactory manner in a normal temperature range of about 70° F. When the circulation pump 22 in the absorption liquid circuit is operating, an equilibrium condition is established in which absorption liquid flows at a certain rate into vessel 40 and is withdrawn therefrom to the generator 23 at essentially the same rate and the liquid surface levels in the vessels 40 and 41 are practically constant. Under these conditions the liquid column in vessel 40 and upper part of conduit 20 balances the liquid column in vessel 41 and conduit 42, the gas pressures acting on the liquid surfaces of the liquid bodies in vessels 40 and 41 being the same.

Active circulation of absorption liquid only takes place through vessel 40 during normal operation and the conduit 42 and vessel 41 essentially constitute a dead-end appendage for absorption liquid in which the liquid body is more or less stagnant. In such normal operation of the system the thermostatic control will be operable to shut off the heat supply to the generator 23 when the cooling unit 10 reaches a predetermined low temperature and substantially all of the liquid refrigerant will be evaporated therein and possibly also in the gas heat exchanger 14. Also, the absorber vessel 40 will function in the normal manner explained above the concentration of refrigerant in the liquid held in the vessels 40 and 41 will be approximately the same. When there is a slight change in the liquid level in vessel 41 during normal operation of the system there is a corresponding change in the liquid level in vessel 40, because the liquid columns of these liquid bodies balance one another.

Let us now assume that the ambient air temperature increases to about 110° F. so that the heat of absorption produced in the absorber unit 16 under the new operating conditions is not effectively given up to the ambient air flowing in thermal relation therewith. Under such conditions refrigerant vapor is not effectively absorbed into absorption liquid in the absorber unit 16, and inert gas will flow to cooling unit 10 having an abnormally high concentration of refrigerant vapor so that the cooling unit 10 will not be capable of producing the desired low refrigerating temperature for which the thermostatic control is adjusted. Under these assumed conditions, the thermostatic control will function to continue the heat supply to the generator 23. By reason of the abnormally high partial pressure of refrigerant vapor in the inert gas introduced into the cooling unit 10, all of the liquid refrigerant supplied to the cooling unit will not be evaporated therein and the excess unevaporated refrigerant passing from the cooling unit 10 will flow to the vessel 41 in which it is accumulated and stored. By storing unevaporated liquid refrigerant in vessel 41, such refrigerant in effect is withheld or withdrawn from the absorption liquid circuit; and the concentration of refrigerant in the absorption liquid eventually will be reduced adequately so that absorption liquid having a sufficiently low concentration of refrigerant will be supplied to absorber unit 16 from generator 23. This will enable the absorber to function properly even at the higher ambient air temperature, thereby enabling the absorber to supply inert gas to cooling unit 10 which is sufficiently poor in refrigerant vapor to cause substantially all of the liquid refrigerant to evaporate in the cooling unit 10 and gas heat exchanger 14.

When the ambient air temperature decreases from the high value assumed above and begins to approach the normal temperature range, it is highly desirable to increase the concentration of refrigerant in the absorption liquid as soon as possible. This is so because, in the lower or normal temperature range, such increase in concentration of refrigerant in the absorption liquid makes it possible to operate the generator 23 at a lower temperature which means that the radiation losses will be reduced, the generator can be operated with less heat input, and the rectification losses will be decreased.

Such decrease in ambient air temperature to the normal temperature range may occur during the night time, for example, which in turn reduces the load on the refrigeration system. Under these conditions the temperature of cooling unit 10 also will decrease; and, when the latter reaches the predetermined low temperature referred to above, the thermostatic control will be operable to shut off the heat supply to the generator 23. As explained above, this will interrupt the normal circulation of absorption liquid and because such liquid to be transferred to the vessel 40 from other parts of the system. By reason of the free liquid communication between the vessels 40 and 41 which is always completely filled with liquid, absorption liquid flows from vessel 40 through the upper part of conduit 20 and conduit 42 into vessel 41 when absorption liquid is transferred to vessel 40. When an adequate quantity of absorption liquid is transferred to the vessel 40 from other parts of the system, liquid refrigerant will be transferred from vessel 41 to vessel 40 through the opening 43 in partition 39 responsive to increase in liquid level in the vessel 40. The liquid remaining in accumulation vessel 41 will be diluted to some extent by the absorption liquid which passes therein from the absorber vessel 40 through conduits 20 and 42. Accordingly, the absorption liquid passing into vessel 41 through the fluid communication passage from the vessel 40 will reduce the concentration of refrigerant in the liquid in vessel 40 and there will be a tendency for the refrigerant concentration to equalize in the liquid bodies in vessels 40 and 41.

After an interval of time, the temperature of evaporator 10 will rise sufficiently to cause the thermostatic control to function and start the heat supply to the generator 23 at which time pump 22 becomes active. Liquid will now be withdrawn from vessel 40 since it forms a part of the active portion of the absorption liquid circuit. At the same time some liquid will also be withdrawn from vessel 41 by the pump 22, although it should be understood that normal circulation of absorption liquid in this vessel usually is absent. After the pump 22 starts raising liquid into the upper end of the boiler pipe 25, an interval of time will pass before absorption liquid again flows into vessel 40. Hence, the entire quantity of liquid held in the container 17 will be reduced to an extent corresponding to the accumulation of liquid in the container 17 when the normal circulation of absorption liquid is reduced and liquid is transferred to absorber vessel 40. When the new pumping period commences, the part of boiler pipe 25 between the levels I and II is depleted of liquid; and the absorber coil 18 can accumulate a comparatively large amount of liquid at the inner wall surfaces thereof, due to the action of capillary and adhesive forces, before a stream of liquid passes through the entire length of the absorber coil. In view of the manner in which normal circulation of absorption liquid is resumed, a certain amount of absorption liquid relatively rich in refrigerant will pass from vessel 41 into the active portion of the absorption liquid circuit when pumping is started following a shut down period.

When absorption liquid again enters vessel 40 from coil 18 and an equilibrium condition is established, the liquid levels in vessels 40 and 41 will be essentially the same due to the free liquid communication therebetween and the same gaseous atmosphere enveloping the liquid bodies in both vessels. When excess liquid refrigerant enters vessel 41 through conduit 15, the liquid surface level in vessel 41 will rise. Under such conditions, the only flow of liquid from vessel 41 to the absorption liquid circuit will be that quantity necessary to maintain a balancing liquid head in the vessel 40.

In addition to having a free liquid communication between the liquid bodies in vessels 40 and 41 beneath the liquid surface levels thereof, it is extremely important in the operation of a system like that shown in Fig. 1 and just described for an adequate quantity of absorption liquid to be transferred from other parts of the system to the absorber vessel 40 when the supply of heat to generator 23 is reduced and the pump 22 is rendered inactive. When the quantity of absorption liquid transferred to the absorber vessel 40 is less than a definite critical value, the quantity of absorption liquid passing from the vessel 40 through the upper part of conduit 20 and conduit 42 to the accumulation or concentration vessel 41 will be inadequate to effect complete mixing of absorption liquid with liquid refrigerant in the vessel 41.

When the mixing of liquid refrigerant with absorption liquid, such as ammonia with water, for example, is incomplete in vessel 41, the full advantages of the accumulation vessel 41 are not realized. This is so because a certain amount of such mixture of refrigerant and absorption liquid, a mixture which is relatively rich in refrigerant when complete mixing is effected, will pass from vessel 41 into the active portion of the absorption liquid circuit when operation of the refrigeration system is again initiated and pumping is resumed following a shut down period. When the quantity of liquid refrigerant transferred from vessel 41 to vessel 40 through the opening 43 in partition 39 is reduced and substantially negligible, because the liquid surface level in vessel 41 does not rise above the level C when absorption liquid is transferred to the vessel 40 from other parts of the system, the liquid refrigerant mixed with the absorption liquid in the vessels 40 and 41 and initially withdrawn therefrom when operation of the pump 22 is instigated, especially the enriched liquid in the accumulation vessel 41, constitutes the bulk of the refrigerant returned to the active portion of the absorption liquid circuit. Hence, it is extremely desirable to transfer an adequate quantity of absorption liquid to the vessel 40 from other parts of the system when redistribution of such liquid is effected, so that complete mixing of absorption liquid will be effected with the liquid refrigerant accumulated in the vessel 41. In this way optimum benefits of the accumulation vessel 41 are gained even when the liquid surface does not rise above the level C when redistribution of absorption liquid takes place.

In accordance with my invention, in order to insure the transfer of an adequate quantity of absorption liquid to the vessel 40 in Fig. 1 when the pump 22 is rendered inactive, a storage vessel 44 is connected in the active portion of the absorption liquid circuit between the absorber coil 18 and absorber vessel 40, the storage vessel 44 serving to arrest flow of absorption liquid in its circuit and enabling a body of arrested liquid to be retained therein. When normal circulation of absorption liquid in its circuit is established, the liquid passes from the extreme lower end of the coil 18 into the storage vessel 44 from which liquid flows through a vertically extending conduit 45 into the upper end of the absorber vessel 40. The upper end of conduit 45 is at a level D which coincides with and is substantially at the same level as the extreme lower end of the coil 18. During normal operation of the system a body of absorption liquid is held in the storage vessel 44 having a liquid surface at the level D, and absorption liquid discharging from the lower end of the coil 18 simply overflows into the upper end of the conduit 45 and passes into the absorber vessel 40. During normal operation when equilibrium conditions in the system are attained, absorption liquid is supplied in this way to the absorber vessel 40 at a rate which is substantially the same as that at which absorption liquid is withdrawn from vessel 40 by the pump 22.

When the heat supply to the generator 23 is stopped or reduced, by the thermostatic control shown in Figs. 1 and 2, to render pump 22 entirely or practically inactive, an adequate quantity of absorption liquid in the absorber vessel 40 is insured by transferring thereto the body of absorption liquid held in the storage vessel 44 as well as from other parts of the system in the manner explained above. Such transfer of liquid from storage vessel 44 may be effected by a suitable wick 46 provided about conduit 45 for drawing liquid upwardly by capillary action at the outer surface of such conduit. The wick 46 may be formed of metal screening having one portion extending downwardly at the outer surface of the conduit 45 and another portion which extends downwardly into the interior of the conduit. The wick 46 desirably must be so dimensioned that it draws liquid at a rate which is less than the rate at which absorption liquid flows into the vessel 44 from the absorber coil 18 during normal operation of the refrigeration system when circulation of absorption liquid is being effected by the pump 22. Such dimensioning of the wick 46 is necessary in order that a body of absorption liquid will collect in the storage vessel 44 to the level D during normal operation of the system.

It has been explained above that absorption refrigeration systems of the kind under consideration may be operated more economically and with less power consumption when provision is made for varying the concentration of refrigerant in the absorption liquid for the different operating conditions encountered. This is especially true when the accumulation vessel 41 makes it possible to operate such a system with absorption solution having a relatively high concentration of refrigerant while under thermostatic control. However, the power consumption becomes impaired when the refrigerant concentration in the absorption solution exceeds a definite high value. This is due to decrease in absorber efficiency with increase in refrigerant concentration of the absorption solution which in turn causes the cooling unit or evaporator to operate at a higher temperature. Under these conditions the refrigeration system must operate for a longer interval of time to produce a definite low temperature in the interior of a refrigerator cabinet, thereby producing a situation where there is a greater likelihood of unevaporated refrigerant passing from the cooling unit without producing useful refrigeration.

In accordance with this invention, in order to prevent loss of unevaporated refrigerant from the cooling unit during an "on" or heating period and to utilize such refrigerant to produce useful refrigeration during the succeeding "off" period when the heat supply is terminated, the low temperature section 10a of the cooling unit 10 is formed of piping or tubing having a cross-sectional area greater than that of the higher temperature section 10b and a dam or overflow point 47 is provided at the end of such low temperature section at the region weak inert gas flows into the presence of liquid refrigerant retained therein. For a refrigeration system of a given capacity, the low temperature section 10a of the cooling unit can be correctly dimensioned so that all of the liquid refrigerant retained therein will evaporate and such low temperature section will be depleted of liquid during the "off" period; and liquid refrigerant will reach the liquid outlet end of the low temperature section 10a during the succeeding "on" or heating period before the thermostat operates to terminate such heating period. By providing the dam 47 and preventing flow of unevaporated refrigerant from the cooling unit 10 for the particular operating conditions referred to above, it will be evident that a refrigeration system may be operated more efficiently than would otherwise be possible. However, the refrigerant accumulating vessel 41 does function to improve the operation of absorption refrigeration systems under the different operating conditions encountered, as explained above.

It has been pointed out above that absorber coil 18 can accumulate liquid at the inner wall surface thereof before a stream of liquid passes through the entire length of the coil. Such liquid is accumulated at the inner wall surface of the coil due to the action of capillary and adhesive forces and results from absorption liquid being circulated through the absorber coil. However, the liquid accumulating in the absorber coil and wetting the inner surface thereof is not arrested and retained in a particular place in the same sense that flow of liquid is arrested by the storage vessel 44 when liquid enters the latter.

It has also been pointed out above that the quantity of liquid held in boiler pipe 25 between the levels I and II defines the static pressure head required to overcome the resistance offered to flow of liquid from the boiler pipe to the upper end of the absorber coil 18. However, the liquid held in the upper portion of the boiler pipe 25, between the liquid levels I and II, is not arrested and retained in a particular place in the same sense that flow of liquid is arrested by the storage vessel 44 when liquid enters the latter.

Accordingly, the expressions "arresting absorption liquid," "retaining such arrested liquid" and "structure for arresting and retaining absorption liquid," which are employed in the claims, are intended to cover an arrangement like that exemplified in the preferred embodiment illustrated and described above in which a storage vessel 44 or similar structure is provided to "arrest" flow of absorption liquid being circulated and to "retain" the arrested liquid rather than to a type of liquid accumulation that takes place when the inner surface of the absorber coil 18 becomes wetted as the result of absorption liquid flowing therethrough, and to a type of liquid accumulation in the upper part of the boiler pipe 25 which provides the necessary static head to overcome friction losses in the path of flow of absorption liquid to the upper part of the absorber coil 18. Further, it is desired to point out that subject matter common to the instant application and to Kogel application Serial No. 355,289, filed May 15, 1953, and not being claimed herein, is being claimed in the aforementioned Kogel application.

Although a single embodiment of the invention has been shown and described, it will be apparent to those skilled in the art that various modifications and changes may be made without departing from the spirit and scope of the invention. It is therefore contemplated to cover all modifications and changes which come within the true spirt of the invention, as pointed out in the following claims.

What is claimed is:

1. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated in a path of flow through and between the generator and absorber, the improvement which comprises the steps of maintaining a body of absorption liquid in a first place in contact with inert gas and also in the path of flow of absorption liquid, flowing unevaporated refrigerant from said evaporator to a second place which serves as a place of accumulation for such liquid, the liquids in the first and second places beneath the surface levels thereof being in free liquid communication in a path which is always completely filled with liquid, arresting absorption liquid being circulated in its path of flow and retaining such arrested liquid in a third place, and redistributing the absorption liquid in its path of flow, such redistribution of the absorption liquid including the step of substantially stopping the circulation of absorption liquid in its path of flow to promote renewal to said first place of absorption liquid retained in said third place.

2. In the art of refrigeration with the aid of a system in which refrigerant vapor is expelled from absorption liquid in a generator, refrigerant vapor is liquefied, liquid refrigerant evaporates in an evaporator, refrigerant vapor is absorbed into absorption liquid in an absorber and absorption liquid is circulated in a path of flow through and between the generator and absorber, the improvement which comprises the steps of maintaining a body of absorption liquid in a first place in said path of flow for such liquid, flowing liquid refrigerant in the system to a second place which serves as a place of accumulation for such liquid, the liquids in the first and second places beneath the surface levels thereof being in free liquid communication in a path which is always completely filled with liquid, arresting absorption liquid being circulated in its path of flow and retaining such arrested liquid in a third place, and redistributing the absorption liquid in its path of flow, such redistribution of the absorption liquid including the step of modifying the normal circulation of absorption liquid in its path of flow to promote removal of absorption liquid retained in said third place into said last-mentioned path of flow.

3. The improvement set forth in claim 2 in which refrigerant vapor is expelled from absorption liquid in the generator by heating during "on" periods of maximum heating alternating with "off" periods of reduced heating, the further step of retaining in said evaporator during the periods of maximum heating unevaporated refrigerant which otherwise would pass therefrom without producing useful refrigeration.

4. In the art of refrigeration with the aid of a system in which heat is supplied to a generator to expel refrigerant vapor from absorption liquid therein, refrigerant vapor is liquefied, liquid refrigerant evaporates in an evaporator, refrigerant vapor is absorbed into absorption liquid in an absorber and absorption liquid is circulated in a path of flow through and between the generator and absorber by raising liquid by vapor lift action due to said heat supply, the improvement which comprises the steps of maintaining a body of absorption liquid in a first place in said path of flow for such liquid, flowing liquid refrigerant in the system to a second place which serves as a place of accumulation for such liquid, the liquids in the first and second places beneath the surface levels thereof being in free liquid communication in a path which is always completely filled with liquid, arresting absorption liquid being circulated in its path of flow and retaining such arrested liquid in a third place, and transferring absorption liquid to said first place from other regions in its path of flow, such transfer of absorption liquid including the step of reducing the rate at which heat is supplied to effect raising of absorption liquid by vapor lift action to substantially terminate the circulation of absorption liquid in its path of flow so as to promote transfer to said first place of absorption liquid retained in said third place.

5. In the art of refrigeration with the aid of a system in which refrigerant vapor is expelled from solution in a generator, refrigerant vapor is liquefied, liquid refrigerant evaporates in an evaporator, refrigerant vapor is absorbed into absorption liquid in an absorber and absorption liquid is normally circulated in a path of flow through and between the generator and absorber, the improvement which comprises the steps of maintaining a body of absorption liquid in a first place in said path of flow for such liquid, flowing unevaporated liquid refrigerant from said evaporator to a second place which serves as a place of accumulation for such liquid, the liquids in the first and second places beneath the surface levels thereof being in free liquid communication in a path which is always completely filled with liquid, arresting absorption liquid being circulated in its path of flow which otherwise flows to said first place and retaining such arrested liquid in a third place, and transferring absorption liquid to said first place from other regions in its path of flow responsive to cessation of normal circulation of such liquid in its path of flow, such transfer of absorption liquid including the step of promoting removal to said first place of absorption liquid retained in said third place.

6. In the art of refrigeration with the aid of a system in which refrigerant vapor is expelled from absorption liquid in a generator, refrigerant vapor is liquefied, liquid refrigerant evaporates in the evaporator, refrigerant vapor is absorbed into absorption liquid in the absorber and absorption liquid is normally circulated in a path of flow through and between the generator and absorber, the improvement which comprises the steps of providing bodies of absorption liquid at first and second places which are in free liquid communication with one another below the surface levels thereof in a path which is always completely filled with liquid, maintaining only the liquid body in said first place in an active portion of said path of flow for absorption liquid, the liquid body in said second place being in intimate physical contact with absorption liquid in the active portion of its path of flow only at said free liquid communication and during normal circulation of absorption liquid essentially forming a stagnant liquid body, flowing liquid refrigerant in the system to said second place which serves as a region in which such liquid is accumulated, arresting absorption liquid being circulated in its path of flow and retaining such arrested liquid in a third place, redistributing the absorption liquid in the system to transfer such liquid to the first place, such redistribution of absorption liquid including the step of effecting flow of such retained liquid from said third place in said path of flow for absorption liquid by modifying the normal circulation of absorption liquid in such path of flow, mixing accumulated liquid refrigerant and absorption liquid by flowing absorption liquid from the first place to the second place through said free liquid communication responsive to transfer of absorption liquid to said first place, and flowing said mixture of liquid refrigerant and absorption liquid in said path of flow to said generator.

7. An absorption refrigeration system comprising circuits for normal circulation of refrigerant and absorption liquid, the circuit for circulation of absorption liquid including a generator and an absorber having a first vessel associated therewith for holding a body of such liquid, a second vessel for holding a body of absorption liquid, the surface level of liquid in said second vessel always rising and falling responsive to rise and fall, respectively, of the surface level of the liquid in said first vessel by passage means which connects said first and second vessels and is completely filled with liquid under all operating conditions of the system, the system including connections for conducting liquid refrigerant to said second vessel for accumulation therein, means including said passage means for mixing such accumulated refrigerant with absorption liquid responsive to redistribution of absorption liquid in its circuit, structure for arresting and retaining absorption liquid being circulated in its circuit and subsequently effecting flow of such arrested and retained liquid in said absorption liquid circuit to promote said redistribution of liquid therein, said structure being connected in said absorption liquid circuit along with said absorber, and said structure being disposed between said generator and said first vessel in the path of flow of absorption liquid in its circuit from the former to the latter.

8. An absorption refrigeration system as set forth in claim 7 in which said structure for arresting and retaining absorption liquid being circulated in its circuit includes a vessel, and means for overflowing liquid from the surface level of the body of such arrested and retained liquid during normal circulation of the absorption liquid.

9. An absorption refrigeration system as set forth in claim 8 is which said structure for effecting flow of such arrested and retained liquid in said absorption liquid circuit includes provisions for effecting such flow responsive to change in an operating condition in the system.

10. An absorption refrigeration system as set forth in claim 9 in which said structure for effecting flow of such arrested and retained liquid in said absorption liquid circuit includes provisions for effecting such flow responsive to a reduction in the rate of flow of absorption liquid in its circuit.

11. An absorption refrigeration system as set forth in claim 10 in which said provisions for effecting flow of arrested and retained absorption liquid for flow in said absorption liquid circuit includes a capillary lift.

12. An absorption refrigeration system as set forth in claim 11 in which said capillary lift is capable of effecting flow of arrested and retained absorption liquid in said absorption liquid circuit at a rate which is less than that at which absorption liquid is normally circulated in its circuit.

13. An absorption refrigeration system comprising circuits for circulation of refrigerant, inert gas and absorption liquid, said inert gas circuit including an evaporator, said refrigerant circuit including conduit means for conducting liquid refrigerant to said evaporator for gravity flow therethrough, said absorption liquid circuit including a generator and an absorber having a first vessel associated therewith for holding a body of such liquid, a second vessel for holding a body of absorption liquid, the surface level of liquid in said second vessel always rising and falling responsive to rise and fall, respectively, of the surface level of the liquid in said first vessel by passage means which connects said first and second vessels and is completely filled with liquid under all operating conditions of the system, the system including connections for conducting liquid refrigerant to said second vessel for accumulation therein, means including said passage means for mixing such accumulated refrigerant with absorption liquid responsive to redistribution of absorption liquid in its circuit, structure for arresting and retaining absorption liquid normally being circulated in its circuit and subsequently effecting flow of such arrested and retained liquid in said absorption liquid circuit to promote said redistribution of liquid therein, said structure being connected in said absorption liquid circuit along with said absorber, said structure being disposed between said generator and said first vessel in the path of flow of absorption liquid in its circuit from the former to the latter, and means for retaining liquid refrigerant in said evaporator.

14. An absorption refrigeration system as set forth in claim 13 in which inert gas flows in counterflow to refrigerant in at least that part of said evaporator in which liquid refrigerant is retained therein.

15. An absorption refrigeration system having circuits for circulation of refrigerant and absorption liquid, the circuit for circulation of absorption liquid comprising a vapor expulsion unit including a pump for raising liquid by vapor lift action and an absorber including a first vessel for holding a body of absorption liquid, a second vessel for holding a body of absorption liquid, the surface level of liquid in said second vessel always rising and falling responsive to rise and fall, respectively, of the surface level of the liquid in said first vessel by passage means which connects said first and second vessels and is completely filled with liquid under all operating conditions of the system, the system including connections for conducting liquid refrigerant to said second vessel for accumulation therein, and means for mixing such accumulated refrigerant with absorption liquid responsive to transfer of such liquid to said first vessel from other parts of said absorption liquid circuit, said other parts including structure connected in series with said absorber for arresting and retaining absorption liquid being circulated in its circuit when said pump is rendered active to raise liquid by vapor lift action and for subsequently effecting flow of such arrested and retained absorption liquid to said first vessel when said pump is rendered inactive to raise liquid by vapor lift action.

16. An absorption refrigeration system as set forth in claim 15 in which said circuit for absorption liquid includes provisions for flowing the mixture of liquid refrigerant and absorption liquid to said vapor expulsion unit when said pump is rendered active to raise liquid by vapor lift action.

17. An absorption refrigeration system as set forth in claim 16 in which said absorber includes a coil and said structure for arresting and retaining absorption liquid being circulated in its circuit for effecting flow of such arrested and retained liquid to said first vessel is interposed between said coil and said first vessel.

18. An absorption refrigeration system as set forth in claim 17 in which said structure comprises a storage vessel connected to receive absorption liquid from said coil and an overflow connection communicating with said first vessel, and means including a wick to effect flow of arrested and retained liquid from said storage vessel to said first vessel when said pump is rendered inactive to raise liquid by vapor lift action.

References Cited in the file of this patent

UNITED STATES PATENTS

| | | |
|---|---|---|
| 1,924,770 | Backstrom | Aug. 29, 1933 |
| 2,210,609 | Ullstrand | Aug. 6, 1940 |
| 2,246,665 | Buffington | June 24, 1941 |
| 2,465,904 | McNeely | Mar. 29, 1949 |
| 2,501,606 | Kogel | Mar. 21, 1950 |
| 2,583,722 | Berestneff | Jan. 29, 1952 |

UNITED STATES PATENT OFFICE

CERTIFICATE OF CORRECTION

Patent No. 2,795,941                                        June 18, 1957

Axel Gosta Hellstrom

It is hereby certified that error appears in the printed specification of the above numbered patent requiring correction and that the said Letters Patent should read as corrected below.

Column 6, line 18, after "above" insert -- and --; column 8, line 61, after the comma and before "by" insert -- as --; column 10, line 34, for "spirt" read -- spirit --; line 59, for "renewal" read -- removal --.

Signed and sealed this 13th day of August 1957.

(SEAL)
Attest:

KARL H. AXLINE
Attesting Officer

ROBERT C. WATSON
Commissioner of Patents